United States Patent
Jennings

(10) Patent No.: US 7,680,065 B2
(45) Date of Patent: Mar. 16, 2010

(54) SYSTEM AND METHOD FOR ROUTING INFORMATION PACKETS

(75) Inventor: Cullen Jennings, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1459 days.

(21) Appl. No.: 11/038,737

(22) Filed: Jan. 18, 2005

(65) Prior Publication Data

US 2006/0159065 A1    Jul. 20, 2006

(51) Int. Cl.
*H04L 12/28* (2006.01)

(52) U.S. Cl. .............. 370/254; 370/252; 709/204; 709/226; 709/245

(58) Field of Classification Search .......... 370/352, 370/353, 389, 401, 466, 254; 455/41.2; 707/1; 709/203, 238, 245, 204, 226
See application file for complete search history.

(56) References Cited

U.S. PATENT DOCUMENTS

| | | | | |
|---|---|---|---|---|
| 6,772,210 B1 * | 8/2004 | Edholm | ............... | 709/226 |
| 7,027,773 B1 * | 4/2006 | McMillin | ............... | 455/41.2 |
| 7,272,650 B2 * | 9/2007 | Elgebaly et al. | ............ | 709/227 |
| 7,328,280 B2 * | 2/2008 | Takeda et al. | ............... | 709/245 |
| 7,333,500 B2 * | 2/2008 | Roshko | ............... | 370/401 |
| 7,385,975 B2 * | 6/2008 | Liu | ............... | 370/389 |
| 7,483,393 B2 * | 1/2009 | Wing | ............... | 370/254 |
| 7,543,064 B2 * | 6/2009 | Juncker et al. | ............ | 709/227 |
| 7,590,758 B2 * | 9/2009 | Takeda et al. | ............ | 709/245 |
| 2003/0233471 A1 * | 12/2003 | Mitchell et al. | ............ | 709/238 |
| 2004/0139230 A1 * | 7/2004 | Kim | ............... | 709/245 |
| 2005/0100047 A1 * | 5/2005 | Liu et al. | ............... | 370/466 |
| 2005/0259637 A1 * | 11/2005 | Chu et al. | ............... | 370/352 |
| 2005/0286519 A1 * | 12/2005 | Ravikumar et al. | ............ | 370/389 |
| 2006/0029083 A1 * | 2/2006 | Kettlewell et al. | ............ | 370/401 |
| 2006/0072569 A1 * | 4/2006 | Eppinger et al. | ............ | 370/389 |
| 2006/0095401 A1 * | 5/2006 | Krikorian et al. | ............ | 707/1 |
| 2007/0130255 A1 * | 6/2007 | Wolovitz et al. | ............ | 709/204 |
| 2007/0140226 A1 * | 6/2007 | Gobara et al. | ............ | 370/353 |
| 2008/0215669 A1 * | 9/2008 | Gaddy et al. | ............ | 709/203 |

* cited by examiner

*Primary Examiner*—Gerald Gauthier
(74) *Attorney, Agent, or Firm*—Trellis IP Law Group, PC

(57) ABSTRACT

A system and method allowing control of VoIP communications by configuring a Network Address Translator (NAT) is provided. In a first NAT configuration, such a port-restricted NAT, peer-to-peer Voice over Internet Protocol (VoIP) communications are permitted between a VoIP originator and a receiver. In a second NAT configuration, such as a symmetrical NAT, peer-to-peer communications are not possible without further cooperation of the NAT. In this manner, an entity that has control of the NAT, such as an ISP, is able to have a degree of control over traffic using network resources such as bandwidth.

20 Claims, 5 Drawing Sheets

SYSTEM AND METHOD FOR ROUTING INFORMATION PACKETS

BACKGROUND OF THE INVENTION

This invention relates in general to routing information packets in a network and more specifically to routing packets via network address translators.

Companies that provide Internet access and resources to subscribers are referred to as Internet Service Providers (ISPs). One resource with which an ISP is concerned is the overall bandwidth capability of the facilities (e.g., routers, switches, servers, bridges, backbones, etc.) that are under the ISP's control. Management and control of traffic that uses the ISP's bandwidth can be critical to the ISP's successful operation.

Some popular uses of the Internet such as Voice over Internet Protocol (VoIP), video, streaming content, etc., require large amounts of bandwidth and are also becoming increasingly popular. These uses can utilize facilities and resources owned and/or operated by unrelated entities. Often, if an entity such as an ISP is committed to open and versatile support of Internet services, the entity may not have sufficient ability to manage or control traffic through its facilities, such as by redirecting traffic for load balancing or other purposes.

Typically, traffic over the Internet and other networks is directed according to sender and receiver Internet Protocol (IP) addresses and port numbers. However, computers on private networks such as a local area network (LAN) are usually not assigned registered IP addresses, and therefore cannot communicate directly with computers on a public network such as the Internet. One of the ways in which communication can take place in this case is by means of Network Address Translators (NATs). NATs are assigned a set of registered IP addresses, which are translated to IP addresses of computers on the private network. These registered IP addresses are then used by the NAT to allow communication between the computers on the private network and computers on the public network. In addition, an entire network of computers on a private network can be assigned a single IP address by a NAT.

An important application of the NAT is with IP telephony such as VoIP. VoIP calls made from private networks can be routed to public networks through the NAT, making communication faster and more reliable. Different types of NATs include full-cone NATs, restricted-cone NATs and port-restricted cone NATs. An ISP usually configures NATs to perform different types of address mappings. Depending on the type of traffic and the NAT configuration there may be such increased use of facilities and resources that serious adverse effects such as overloading and failure can occur. This may result in users experiencing a slowdown or stopping of network response.

Accordingly, there is a need for a method and system that provides management of network traffic.

SUMMARY OF EMBODIMENTS OF THE INVENTION

Embodiments of the invention allow control of VoIP communications by configuring a NAT. In a first NAT configuration, such as a port-restricted NAT, peer-to-peer VoIP communications are permitted between a VoIP originator and receiver. In a second NAT configuration, such as a symmetrical NAT, peer-to-peer communications are not possible without further cooperation of the NAT. In this manner, an entity that has control of the NAT, such as an ISP, is able to have a degree of control over traffic using network resources such as bandwidth.

In one embodiment, the invention provides a system for controlling routing of information packets over a network. The network comprises a first entity, a second entity, and a plurality of users. The first entity configures the system. The system comprises (i) a first port for communicating between a first user and a second entity; (ii) a second port for communicating between the first user and a second user; (iii) an activation module for activating the second port on the system, for routing the information packets; and (iv) an address translating means for translating a private address of a user to a public address.

In another embodiment, the invention provides a system for controlling the routing of information packets over a network. The network comprises a first entity, a second entity and a plurality of users. The first entity configures the system. The system comprises (i) means for routing information packets between a first user and the second entity, and (ii) means for routing information packets between the first user and the second user.

In another embodiment, the invention provides a method for controlling the routing of information packets over a network. The network comprises a first entity, a second entity and a plurality of users. The first entity configures a system used for communication between the plurality of users, the first entity, and the second entity. The information packets are sent through a plurality of ports in the system. The method comprises (i) sending an initiation information packet for communication between a first user and a second user, the information packet being sent by the first user to the second entity through a first port; (ii) identifying the address of the second user for communication, based on the initiation information packet, the identification being carried out by the second entity; and (iii) transmitting an information packet between the first user and the second user, based on the identified address, the information packet being sent by the second user to the first user through a second port on the system.

These provisions, together with the various ancillary provisions and features that will become apparent to those skilled in the art, as the following description proceeds, are attained by devices, assemblies, systems and methods of the embodiments of the present invention, various embodiments thereof being shown with reference to the accompanying drawings, by way of example only, wherein:

DETAILED DESCRIPTION OF EMBODIMENTS OF THE INVENTION

The invention relates to a method, system and computer program product for routing information packets between a plurality of users residing in different networks. In various embodiments of the invention, the users can be data-processing devices including computers or hardware devices such as printers, telephonic devices or calculators capable of being connected to other devices on a network. The network includes a first entity such as an Internet Service Provider (ISP), and a second entity such as a Voice over Internet Protocol (VoIP) service provider. A user initiating communication through the information packets, hereinafter referred to as the originator, is located on a private network such as a Local Area Network (LAN), while the user that receives the communication, hereinafter referred to as the receiver, may be located on another LAN or a public network such as the Internet. The first entity provides the infrastructure for communication, while the second entity provides value-added services such as VoIP. Communication between the users takes place by means of an address translator such as a Network Address Translator (NAT). The NAT enables communication between an originator and a receiver through address translation. The functioning of the NAT will be explained further with reference to FIG. 1 and FIG. 2.

Figure 1:
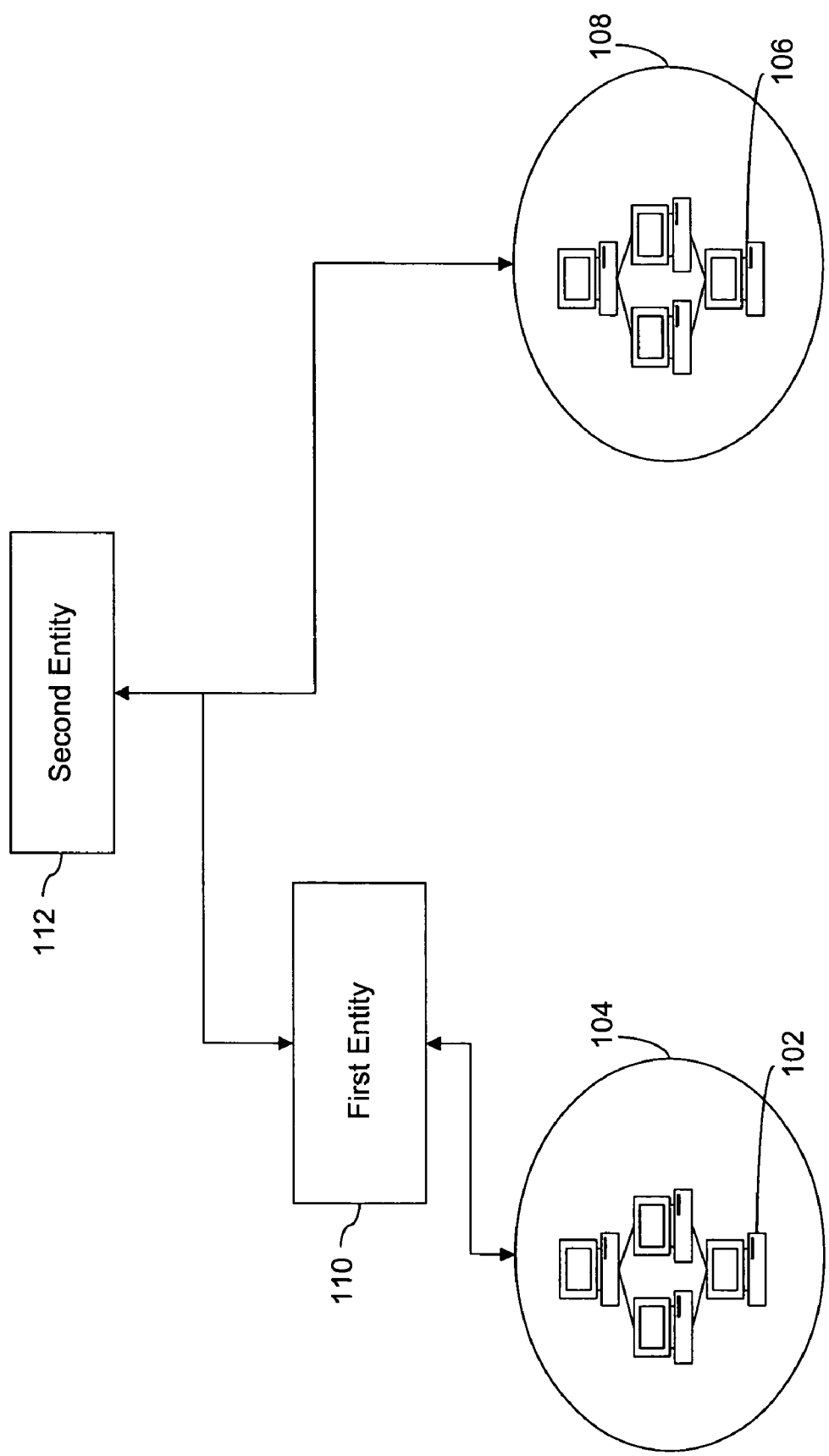
FIG. 1 illustrates a network of originators, receivers and service providers, according to an embodiment of the present invention.

FIG. 1 illustrates a network of originators, receivers and service providers, according to an embodiment of the present invention. In an exemplary embodiment of the invention, originators can reside in private networks. An IP address and a port number characterize each originator and receiver. However, the IP addresses and port numbers of the originators on the private network may be unregistered and therefore non-routable, since the IP addresses and port numbers may not have been specifically allocated by the Internet Assigned Numbers Authority (IANA). On the other hand, the NAT is assigned a group of registered IP addresses and port numbers that can be routed to public networks.

As depicted in the figure, an originator 102 in a private network 104 initiates communication with a receiver 106 residing on another private or public network 108. A first entity 110 provides the infrastructure for this communication. In an embodiment of the invention, first entity 110 is an Internet Service Provider (ISP) that provides access to the Internet and governs the functioning of any network device required for communication between originator 102 and receiver 106. In an embodiment of the invention, a second entity 112 is a Voice over IP (VoIP) service provider. Second entity 112 provides the necessary configuration for value-added services such as telephone calls to be made over computer networks, supporting real-time, two-way transmission of conversations using Internet Protocol (IP). Alternatively, second entity 112 may support VoIP communication through ordinary telephones using special adapters to connect to another network. Most VoIP implementations are based on the H.323, Session Initiation Protocol (SIP) and Media Gateway Control Protocol (MGCP) standards, but any suitable approach to VoIP can be used.

To carry out communication with receiver 106 in network 108, originator 102 sends an initiation information packet to a network device governed by first entity 110. In various embodiments of the invention, the network device can be a Network Address Translator (NAT). The NAT enables the unregistered IP address and port number of originator 102 to be translated to a registered IP address and port number of the NAT. This registered address and port number is then used as a public address and port number by originator 102 and is routable to receivers on network 108.

In accordance with an embodiment of the invention, the NAT enables second entity 112 to receive the information packet from originator 102. Thereafter, second entity 112 identifies the IP address of receiver 106 and enables communication between originator 102 and receiver 106 through the NAT. In an embodiment of the present invention, the sending and receiving of information packets by originator 102 is carried out through a common single port on the NAT. Such a NAT, known as a port restricted NAT, allows network traffic only through one port.

In accordance with another embodiment of the invention, first entity 110 enables changing the configuration of the NAT from a port restricted NAT to a symmetric NAT based on a predetermined network traffic condition. In an embodiment of the invention, the predetermined network traffic condition is a network load on the first entity determined on the basis of network resources such as bandwidth, level of use of the NAT, level of the type of traffic and the like. In an embodiment the type of traffic includes, but is not limited to VoIP, streaming media, and file downloads such as video and audio files.

Changing configuration of the NAT can influence loading on different entities' facilities and resources. This can be especially important as traffic increases and resources are taxed. Changing first entity 110's NAT's configuration can cause, or force, sending and receiving of information packets through separate ports. This, in turn, can require continued participation of second entity 112 if the second entity has no way to remove itself from continued communications. For example, one way for the second entity to remove itself from continued communications is where the second entity causes the sender and receiver to communicate directly with each other through the NAT. However, this typically requires non-symmetric (e.g., port-restricted) NAT operation. If the second entity must continue to participate in the data transfers it will typically mean that the second entity's facilities and network resources are being used. Such use can be significant to efficient network operations and to successful commercial or business practices and could cause the second entity to take steps to reduce overall traffic. Also, this can cause the second entity to provide additional value added services for communications between the devices.

Figure 2:
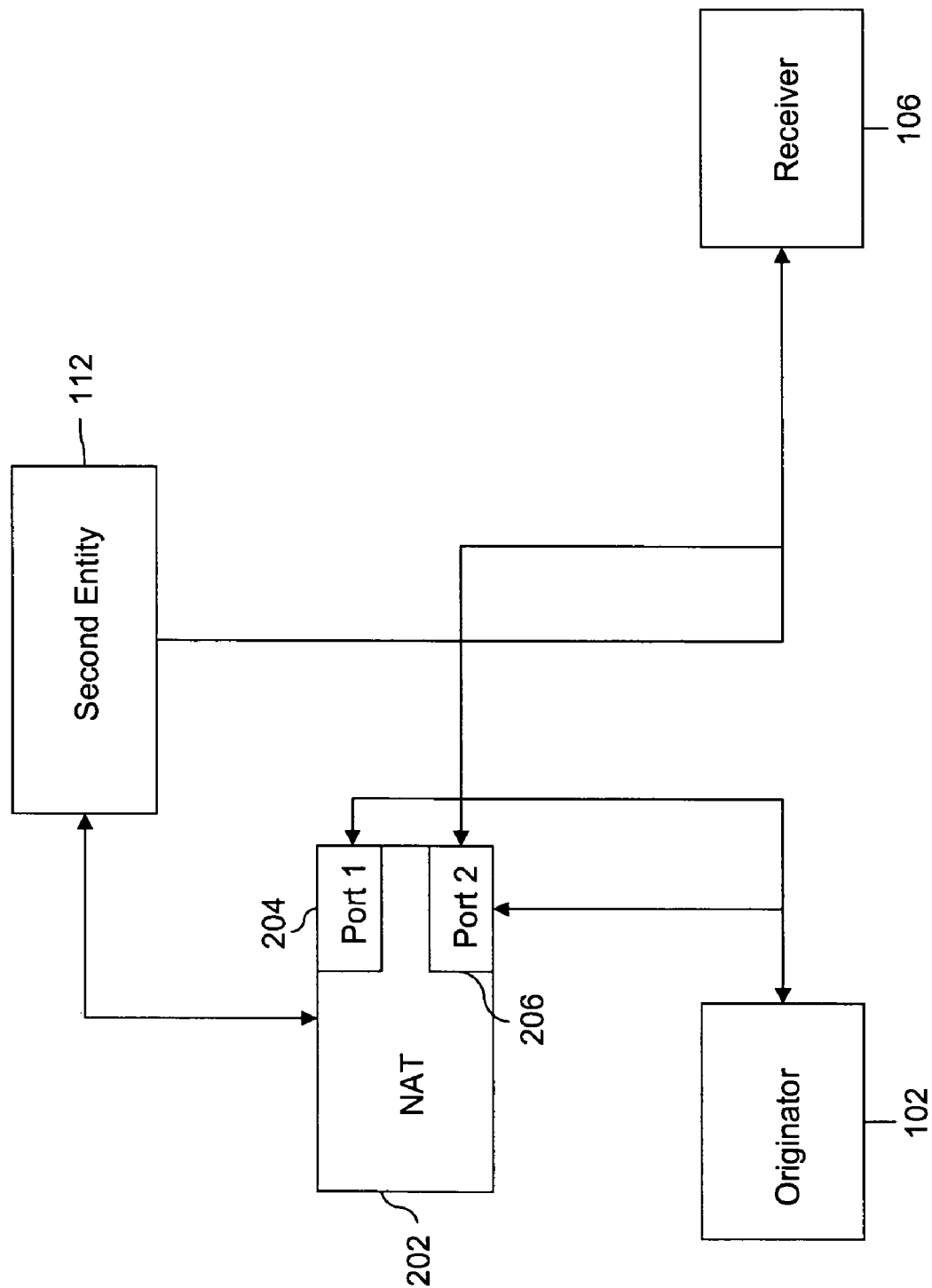
FIG. 2 illustrates in detail the network between an originator and receiver, a Network Address Translator (NAT), and the service providers, according to an embodiment of the invention.

FIG. 2 illustrates in detail the network between originator 102, receiver 106, a NAT 202, and second entity 112, in accordance with an embodiment of the invention. As described with reference to FIG. 1, NAT 202, controlled by first entity 110, receives an information packet from originator 102. According to an embodiment of the invention, NAT 202 resides in a router and determines the next network point to which an information packet should be forwarded, enroute to its destination.

Accordingly, the following process is carried out: NAT 202 assigns the IP address and port number of originator 102 to a registered IP address and port number of NAT 202, based on a mapping technique, for example, the port receiving information packets from originator 102 is a port 204 on NAT 202. Upon receiving this information packet, NAT 202's registered IP address and port 204 is mapped to an IP address and port of second entity 112. The mapping is then used to transfer the information packet to second entity 112. Upon receiving the information packet, second entity 112 determines that the information packet is to be sent to receiver 106 and sends the information packet to receiver 106. Thereafter, first entity 110 checks if the network traffic has reached the predetermined condition. If the network load on first entity 110 has not reached the predetermined network traffic condition, NAT 202 functions as a port restricted NAT allowing communication through port 204 only.

However, if the predetermined network traffic condition has been met, then NAT 202 functions as a symmetric NAT allowing communication through port 204 and a port 206. Port 204 is used to communicate between second entity 112 and originator 102, while port 206 is used to communicate between originator 102 and receiver 106. In accordance with an embodiment of the invention, for NAT 202 to function as a symmetric NAT and receive information packets from receiver 106 through port 206, originator 102 is required to first send an information packet to receiver 106 through port 206. This communication gives permission to receiver 106 to communicate with originator 102 via port 206. Additionally, this removes the dependence of first entity 202 on second entity 112 for allowing communication between originator 102 and receiver 106. Therefore, when NAT 202 is configured as a symmetric NAT, network load on first entity 202 is reduced making communication comparatively faster. In an embodiment of the invention, port 206 is enabled by means of an activation module. The activation module may be a software module residing in NAT 202 that can activate port 206 once the predetermined condition has been met.

In an embodiment of the invention, in the case where the SIP standard is being used for communication, an 'rport' parameter is specified in the Via header of the information packet sent by user 102. The 'rport' parameter does not have any value and is used as a flag to signal to originator 102 to communicate directly with receiver 106, without the use of second entity 112. Once a communication channel is established through port 206, subsequent exchange of information packets to and from users 102 and 106 takes place exclusively through port 206.

Figure 3:
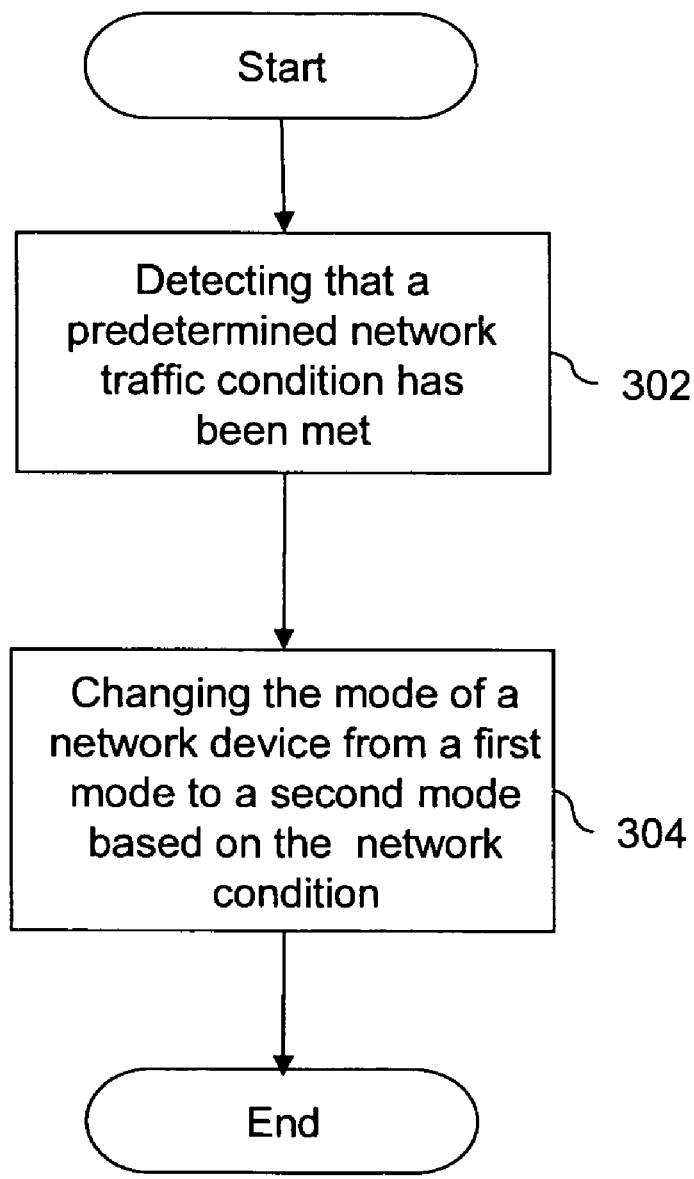
FIG. 3 is a flow chart depicting a method used for changing the mode of the NAT, according to an embodiment of the invention.

FIG. 3 is a flow chart depicting the method used for changing the mode of NAT 202 from a port restricted NAT to a symmetric NAT. In an embodiment of the invention, the default mode of NAT 202 is of a port restricted NAT that allows communication exclusively through one port. At step 302, a check is made on first entity 110 to determine whether a predetermined network traffic condition has been met or not. At step 304, the mode of NAT 202 is changed accordingly. If the predetermined network traffic condition has been met, then the mode of NAT 202 is changed to that of a symmetric NAT. Otherwise, the mode is left to the default port restricted NAT mode. In the port restricted NAT mode, an increased amount of traffic is sent through the resources under the control of first entity 110. In the symmetric NAT mode, an increased amount of traffic is sent through the resources under control of second entity 112.

Figure 4:
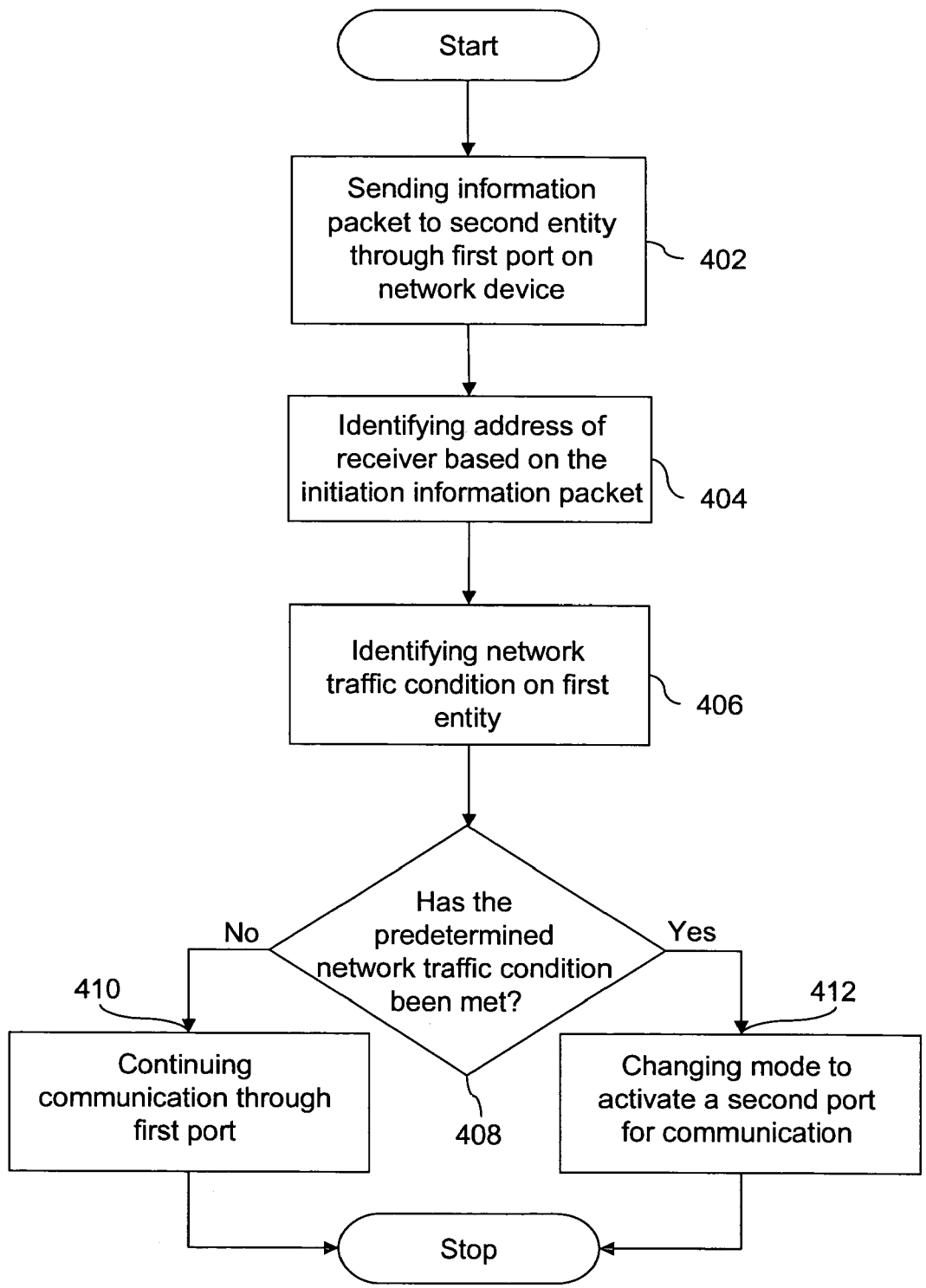
FIG. 4 is a flowchart illustrating a method to control routing of information packets, according to an embodiment of the invention.

FIG. 4 is a flowchart illustrating the method used in an embodiment of the present invention. At step 402, an information packet is sent from originator 102 in a private network to second entity 112 by means of a first port such as port 204 on a network device such as NAT 202. This step is carried out, based on the method described in conjunction with reference to FIG. 1 and FIG. 2. At step 404, second entity 112 identifies the address of a receiver to which the information packet is to be sent. In an embodiment according to the present invention, second entity 112 reads the appropriate headers in the information packet, to identify the address of the destination of the information packet. The address, for instance, can be of receiver 106. Second entity 112 then sends the information packet to receiver 106 on network 108.

Thereafter, at step 406, the network traffic condition on first entity 110 is identified. At step 408, the identified network traffic condition is checked to determine if a predetermined network traffic condition has been met. At step 410, if the predetermined network traffic condition has not been met, then communication between receiver 106 and originator 102 is carried out through port 204 according to the method described with reference to FIG. 2. If the predetermined network traffic condition has been met, a second port such as port 206 is activated on NAT 202. At step 412, communication between receiver 106 and originator 102 then takes place through port 206 according to the method described with reference to FIG. 2.

Figure 5:
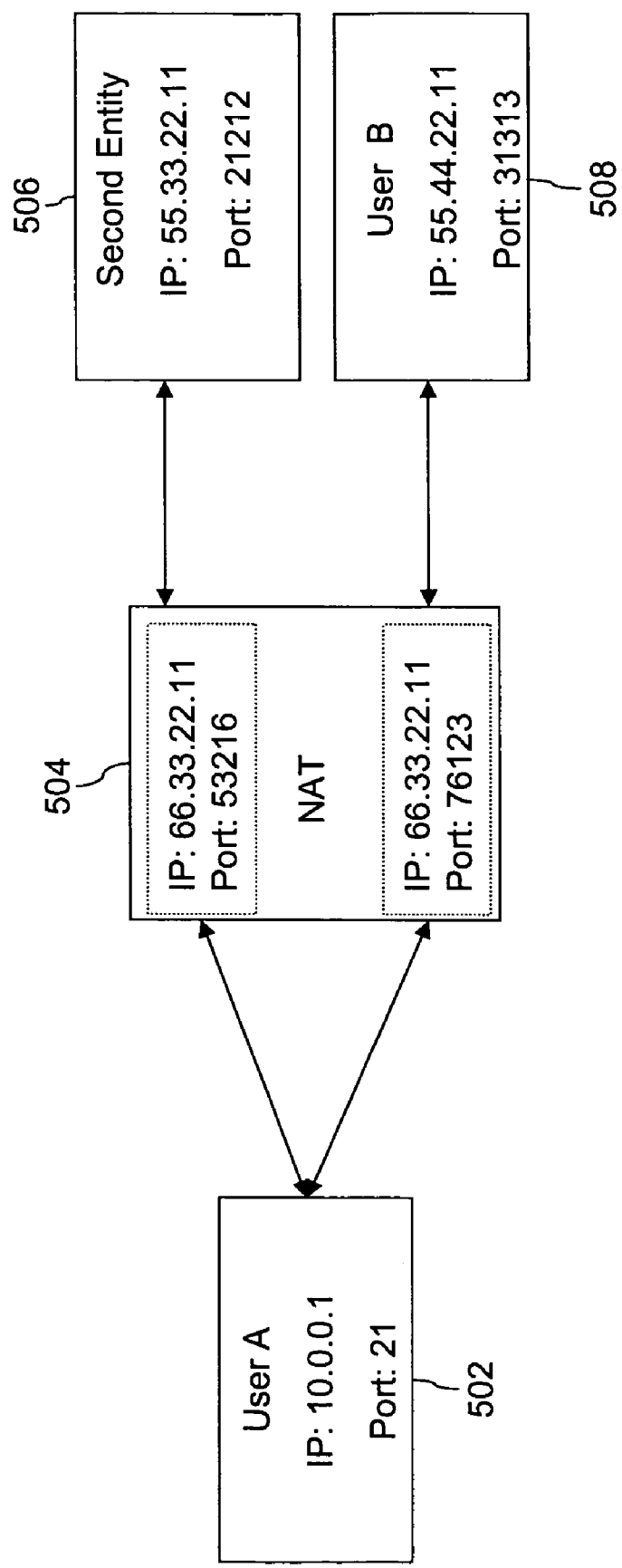
FIG. 5 illustrates a network of an originator and receiver with a NAT, according to an embodiment of the invention.

The method described above is explained further with reference to FIG. 5. Consider an originator 502 on a private network characterized by an unregistered IP address: 10.0.0.1 and a port number 21. A symmetric NAT 504, assigned a set of registered IP addresses and port numbers, is used for routing an information packet sent from originator 502 to a destination IP address and port number. In an exemplary embodiment, the information packet is to be sent to a second entity 506 and a receiver 508. Second entity 506 has an IP address 55.33.22.11 and a port number 21212, while receiver 508 has an IP address 55.44.22.11 and a port number 76123. NAT 504 replaces originator 502's non-routable IP address with one of the registered IP addresses and port numbers in an address translation table, for instance, for an information packet to be sent to second entity 506, IP address 66.33.22.11 and a port number 53216 is assigned to the IP address and port number of originator 502. Similarly, an information packet sent to receiver 508 is assigned the same IP address but a different port number 76123. An exemplary mapping for the translation of an information packet from originator 502 to second entity 506 is as follows:

10.0.0.1<->port number 53216 (for second entity: 21212)

A similar mapping takes place for the information packet to be sent to receiver 508:

10.0.0.1<->port number 76123 (for user B: 31313)

When an information packet comes back from the destination computer, NAT 504 checks the destination address on the packet and the address translation table, to see which user on the private network the packet belongs to. In the present example, however, there is only one originator 502 on the private network. The bi-directional arrow shown between the originator 502, NAT 504, second entity 506, and receiver 508 symbolizes this form of communication. In case of port restricted NAT configuration, only one port of NAT 504 is used to communicate between originator 502, receiver 508 and second entity 506.

In various embodiments of the invention, the initiation information packet is sent, based on SIP, which are compatible with the symmetric NAT. In an embodiment of the invention, a Simple Traversal of User Datagram Protocol (UDP) through NAT (STUN) protocol may be used in conjunction with a Traversal Using Relay NAT (TURN) server for communication. Referring back to FIG. 2, the TURN server enables originator 102 to identify the port and IP address used by NAT 202 for communication. This port and IP address is then used for all subsequent communication from originator 102 to any number of receivers on the public network.

The various embodiments of the invention allow the ISP to either permit or deny the ability of a second entity such as a VoIP service provider to use symmetric NAT. In this way, the ISP can restrict the ability of the VoIP service provider to cause peering traffic, or traffic that does not have to pass through the VoIP service provider network resources. This mechanism can be used to perform coarse controlling of network resources that can be critical in VoIP applications.

Further, the various embodiments of the invention allow distribution of network traffic between first and second entities 110 and 112, by allocating separate ports if the network traffic increases. This is achieved by changing the configuration of the NAT from port restricted NAT to symmetric NAT. The distribution of traffic helps in reducing the network load on the first entity. Further, the use of a second port also increases the efficiency and speed of NAT 202, making communication faster and more reliable.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A 'computer-readable medium' for purposes of embodiments of the present invention may be any medium that can contain and store the computer program for use by or in connection with the instruction execution system apparatus, system or device. The computer-readable medium can be, by way of example only but not by limitation, a semiconductor system, apparatus, system, device, or computer memory. The computer-readable medium may have suitable instructions for synchronously presenting multiple video program ID streams, such as on a display screen, or for providing for input or presenting in accordance with various embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for controlling traffic in a network, wherein an originator initiates a transfer of information with a receiver, wherein a network device coupled between the originator and the receiver has at least two modes of operation, the method comprising:
    translating an unregistered address for the originator into a registered address using a network address translator (NAT) in the network device, wherein the network device operates in a first mode of operation with a port-restricted NAT configuration such that the originator sends information packets to the receiver using a first port in the NAT;
    detecting that a predetermined network traffic condition has been met; and
    changing operation of the network device from the first mode of operation to a second mode of operation in response to the detected predetermined network traffic condition, wherein the second mode of operation comprises a symmetrical NAT configuration such that the receiver subsequently sends information packets to the originator using a second port in the NAT.

2. The method of claim 1, wherein the detecting the predetermined network traffic condition comprises detecting that voice-over-internet protocol (VoIP) transmissions are occurring.

3. The method of claim 1, wherein the detected predetermined network traffic condition includes a level of bandwidth use.

4. The method of claim 1, wherein the detected predetermined network traffic condition includes a level of device use.

5. The method of claim 1, wherein the detected predetermined network traffic condition includes a level of a type of traffic.

6. The method of claim 5, wherein the type of traffic includes voice-over-internet protocol.

7. The method of claim 5, wherein the type of traffic includes streaming media.

8. The method of claim 5, wherein the type of traffic includes file downloads.

9. The method of claim 8, wherein the file downloads include video.

10. The method of claim 1, wherein the detecting and the changing are done by a first entity, wherein in the first mode of operation an increased amount of traffic is sent through resources controlled by the first entity, and wherein in the second mode of operation an increased amount of traffic is sent through resources controlled by a second entity.

11. The method of claim 10, wherein the first entity includes an Internet service provider (ISP).

12. The method of claim 10, wherein the second entity includes a voice-over Internet Protocol (VoIP) provider.

13. The method of claim 1, wherein a Traversal Using Relay NAT (TURN) server is used for the transfer of information.

14. The method of claim 1, wherein an rport parameter is specified in a Via header of an information packet of the transfer of information.

15. An apparatus for controlling traffic in a network, wherein an originator initiates a transfer of information with a receiver, wherein a network device coupled between the originator and the receiver has at least two modes of operation, the apparatus comprising:
    a processor; and
    a computer-readable storage medium including instructions executable by the processor, the storage medium comprising:
        one or more instructions for translating an unregistered address for the originator into a registered address using a network address translator (NAT) in the network device, wherein the network device operates in a first mode of operation with a port-restricted NAT configuration such that the originator sends information packets to the receiver using a first port in the NAT;
        one or more instructions for detecting that a predetermined network traffic condition has been met; and
        one or more instructions for changing operation of the network device from the first mode of operation to a second mode of operation in response to the detected predetermined network traffic condition, wherein the second mode of operation comprises a symmetrical NAT configuration such that the receiver subsequently sends information packets to the originator using a second port in the NAT.

16. The apparatus of claim 15, wherein the detected predetermined traffic condition comprises occurrence of voice-over-internet protocol (VoIP) transmissions.

17. The apparatus of claim 15, wherein the detected predetermined network traffic condition comprises a level of bandwidth use.

18. The apparatus of claim 15, wherein the detected predetermined network traffic condition comprises a level of device use.

19. The apparatus of claim 15, wherein the detected predetermined network traffic condition comprises a level of a type of traffic.

20. A computer-readable storage medium including instructions executable by a processor for controlling traffic in a network, wherein an originator initiates a transfer of information with a receiver, wherein a network device coupled between the originator and the receiver has at least two modes of operation, the storage medium comprising:
one or more instructions for translating an unregistered address for the originator into a registered address using a network address translator (NAT) in the network device, wherein the network device operates in a first mode of operation with a port-restricted NAT configuration such that the originator sends information packets to the receiver using a first port in the NAT;
one or more instructions for detecting that a predetermined network traffic condition has been met; and
one or more instructions for changing operation of the network device from the first mode of operation to a second mode of operation in response to the detected predetermined network traffic condition, wherein the second mode of operation comprises a symmetrical NAT configuration such that the receiver subsequently sends information packets to the originator using a second port in the NAT.

* * * * *